(12) United States Patent
Mozes et al.

(10) Patent No.: US 10,182,017 B2
(45) Date of Patent: Jan. 15, 2019

(54) ESTIMATING MULTIPLE DISTINCT-FLOW COUNTS IN PARALLEL

(71) Applicant: MELLANOX TECHNOLOGIES TLV LTD., Raanana (IL)

(72) Inventors: David Mozes, Yokneam Moshava (IL); Liron Mula, Ramat Gan (IL); Benny Koren, Zichron Yaakov (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 0 days.

(21) Appl. No.: 15/492,003

(22) Filed: Apr. 20, 2017

(65) Prior Publication Data

US 2018/0006921 A1 Jan. 4, 2018

Related U.S. Application Data

(60) Provisional application No. 62/356,570, filed on Jun. 30, 2016.

(51) Int. Cl.
  *H04L 12/875* (2013.01)
  *H04L 29/06* (2006.01)
  *H04L 12/26* (2006.01)

(52) U.S. Cl.
  CPC .......... *H04L 47/56* (2013.01); *H04L 43/028* (2013.01); *H04L 43/0876* (2013.01); *H04L 63/00* (2013.01); *H04L 69/22* (2013.01)

(58) Field of Classification Search
  None
  See application file for complete search history.

(56) References Cited

U.S. PATENT DOCUMENTS

| | | |
|---|---|---|
| 5,689,508 A | 11/1997 | Lyles |
| 6,229,812 B1 | 5/2001 | Parruck et al. |
| 6,650,640 B1 * | 11/2003 | Muller .................. H04L 49/602 370/392 |

(Continued)

OTHER PUBLICATIONS

Flajolet et al., "HyperLogLog: the analysis of a near-optimal cardinality estimation algorithm", Conference on Analysis of Algorithms (AofA'07), Juan des Pins, France, pp. 127-146, Jun. 17-22, 2007.

(Continued)

*Primary Examiner* — Hicham B Foud
(74) *Attorney, Agent, or Firm* — D. Kligler IP Services Ltd.

(57) ABSTRACT

A network switch includes circuitry, multiple ports and multiple hardware-implemented distinct-flow counters. The multiple ports are configured to receive packets from a communication network. Each of the multiple hardware-implemented distinct-flow counters is configured to receive (i) a respective count definition specifying one or more packet-header fields and (ii) a respective subset of the received packets, and to estimate a respective number of distinct flows that are present in the subset, by evaluating, over the packets in the subset, a number of distinct values in the packet-header fields belonging to the count definition. The circuitry is configured to provide each of the distinct-flow counters with the respective subset of the received packets, including providing a given packet to a plurality of the distinct-flow counters, and to identify an event-of-interest based on numbers of distinct flows estimated by the distinct-flow counters.

24 Claims, 3 Drawing Sheets

(56) References Cited

U.S. PATENT DOCUMENTS

| | | | |
|---|---|---|---|
| 6,937,561 | B2 | 8/2005 | Chiussi et al. |
| 7,023,866 | B2 | 4/2006 | Giroux et al. |
| 7,080,168 | B2 | 7/2006 | Dasgupta et al. |
| 7,433,953 | B1 | 10/2008 | Kappler et al. |
| 7,539,199 | B2 | 5/2009 | Shrimali et al. |
| 7,698,412 | B2 | 4/2010 | Narsinh et al. |
| 7,805,535 | B2 | 9/2010 | Narsinh et al. |
| 8,045,563 | B2 | 10/2011 | Lee |
| 8,111,649 | B1 | 2/2012 | Agarwall et al. |
| 8,209,429 | B2 | 6/2012 | Jacobs et al. |
| 8,259,585 | B1 | 9/2012 | S P et al. |
| 8,274,988 | B2 | 9/2012 | Rojas-Cessa et al. |
| 8,406,132 | B2 | 3/2013 | Cao et al. |
| 8,520,522 | B1 | 8/2013 | Goldman et al. |
| 8,627,472 | B2 | 1/2014 | Kind et al. |
| 8,848,529 | B2 | 9/2014 | Voruganti et al. |
| 9,083,655 | B2 | 7/2015 | Matthews et al. |
| 9,276,852 | B2 * | 3/2016 | Akiyoshi ............ H04L 49/3009 |
| 9,824,092 | B2 * | 11/2017 | Shamis ............ G06F 17/30589 |
| 9,832,143 | B2 | 11/2017 | Srinivasan et al. |
| 9,838,338 | B2 | 12/2017 | Srinivasan |
| 2003/0165148 | A1 | 9/2003 | Bishard |
| 2003/0219026 | A1 | 11/2003 | Sun et al. |
| 2005/0259578 | A1 | 11/2005 | Shinagawa et al. |
| 2006/0028999 | A1 * | 2/2006 | Iakobashvili ......... H04L 41/142 |
| | | | 370/252 |
| 2007/0104102 | A1 | 5/2007 | Opsasnick |
| 2007/0127514 | A1 | 6/2007 | Post et al. |
| 2007/0153697 | A1 | 7/2007 | Kwan et al. |
| 2008/0063004 | A1 | 3/2008 | Himberger et al. |
| 2008/0240139 | A1 | 10/2008 | Kodialam et al. |
| 2009/0138577 | A1 * | 5/2009 | Casado .................. H04L 41/06 |
| | | | 709/220 |
| 2009/0287822 | A1 | 11/2009 | Berdardi et al. |
| 2010/0098104 | A1 | 4/2010 | Marshall |
| 2010/0260198 | A1 | 10/2010 | Rojas-Cessa et al. |
| 2011/0007687 | A1 | 1/2011 | Howe et al. |
| 2011/0158248 | A1 | 6/2011 | Vorunganti et al. |
| 2012/0233349 | A1 | 9/2012 | Aybay |
| 2013/0044755 | A1 | 2/2013 | Liu et al. |
| 2013/0259052 | A1 * | 10/2013 | Akiyosh ............ H04L 49/3009 |
| | | | 370/392 |
| 2014/0032736 | A1 * | 1/2014 | Mounaouar ........... H04L 43/026 |
| | | | 709/224 |
| 2014/0122771 | A1 | 5/2014 | Chrysos et al. |
| 2014/0133307 | A1 | 5/2014 | Yoshida et al. |
| 2014/0233399 | A1 * | 8/2014 | Mann ................. H04L 41/0806 |
| | | | 370/248 |
| 2014/0307736 | A1 * | 10/2014 | Krishnan ................ H04L 69/22 |
| | | | 370/392 |
| 2014/0325649 | A1 * | 10/2014 | Zhang .................. H04L 43/024 |
| | | | 726/23 |
| 2015/0016255 | A1 * | 1/2015 | Bisht ...................... H04L 47/11 |
| | | | 370/235 |
| 2015/0036498 | A1 * | 2/2015 | Ehara .................... H04L 47/12 |
| | | | 370/235 |
| 2015/0341267 | A1 * | 11/2015 | Chiba .................... H04L 47/10 |
| | | | 370/392 |
| 2016/0065484 | A1 | 3/2016 | Suzuki et al. |
| 2016/0127267 | A1 | 5/2016 | Kumar et al. |
| 2017/0063660 | A1 * | 3/2017 | Viquez .................... H04L 49/90 |
| 2017/0118041 | A1 * | 4/2017 | Bhattacharya ........ H04L 12/462 |
| 2017/0149877 | A1 | 5/2017 | Kabbani et al. |
| 2017/0195254 | A1 * | 7/2017 | Pham ...................... H04L 49/25 |
| 2017/0195292 | A1 * | 7/2017 | Pham ................... H04L 63/0245 |
| 2017/0331725 | A1 * | 11/2017 | Rosenberry ........... H04L 49/253 |
| 2018/0102937 | A1 * | 4/2018 | Casado ................... H04L 41/06 |
| 2018/0123983 | A1 | 5/2018 | Gunner |

OTHER PUBLICATIONS

Mula et al., U.S. Appl. No. 15/469,643, filed Mar. 27, 2017.
Lee et al., "Approximating Age-Based Arbitration in On-Chip Networks", Proceedings of the 19th international conference on parallel architectures and compilation techniques,Vienna, Austria, pp. 575-576, Sep. 11-15, 2010.
802.1Qaz-2011—IEEE Standard for Local and metropolitan area networks, "Media Access Control (MAC) Bridges and Virtual Bridged Local Area Networks", Amendment 18: Enhanced Transmission Selection for Bandwidth Sharing Between Traffic Classes, IEEE Computer Society, 110 pages, Sep. 30, 2011.
Durand et al., "Loglog Counting of Large Cardinalities", Algorithms Project, INRIA—Rocquencourt, F78153 Le Chesnay (France), LNCS 2832, pp. 605-617, ESA 2003.
U.S. Appl. No. 15/469,643 office action dated May 29, 2016.

* cited by examiner

ESTIMATING MULTIPLE DISTINCT-FLOW COUNTS IN PARALLEL

CROSS-REFERENCE TO RELATED APPLICATIONS

This application claims the benefit of U.S. Provisional Patent Application 62/356,570, filed Jun. 30, 2016, whose disclosure is incorporated herein by reference.

TECHNICAL FIELD

Embodiments described herein relate generally to traffic monitoring in communication networks, and particularly to methods and systems for estimating multiple distinct-flow counts in parallel.

BACKGROUND

Monitoring traffic in communication networks is required for various applications, such as network management and optimization. Other applications include detecting traffic anomalies caused, for example, by malicious attacks. Methods for traffic monitoring and analysis are known in the art.

For example, U.S. Pat. No. 8,627,472, whose disclosure is incorporated herein by reference, describes a method for determining a heavy distinct hitter (HDH) in a data stream that comprises a plurality of element-value (e,v) pairs, by a data traffic monitor. The method includes receiving the plurality of (e,v) pairs from the data stream by an HDH module in the data traffic monitor, the HDH module being in communication with a counter block comprising a plurality of hash functions and a respective pair of distinct counting primitives associated with each hash function. The method further comprises adding each of the plurality of (e,v) pairs to one of the distinct counting primitives of the respective pair of distinct counting primitives for each of the plurality of hash functions in the counter block.

U.S. Pat. No. 8,406,132, whose disclosure is incorporated herein by reference, describes a method for monitoring a network. The method includes receiving, from each host of a set of two or more hosts of the network, a corresponding vector of M components constructed based on data packets received at the host during a time period, M being an integer greater than 1, and estimating a cardinality distribution for the hosts in the set, based on the constructed vectors and using an expectation-maximization algorithm. Constructing the vector includes updating a component of the vector of the corresponding host in response to the corresponding host receiving a data packet, the updating including selecting the component for updating by hashing one or more fields of the data packet received by the corresponding host.

Traffic monitoring sometimes involves counting a number of distinct values in a large set of elements. Methods for estimating the number of distinct values in a set are described, for example, by Flajole et al., in "HyperLog Log: the analysis of a near-optimal cardinality estimation algorithm," the 2007 Conference on Analysis of Algorithms (AofA'07), Juan des Pins, France, Jun. 17-22, 2007, which is incorporated herein by reference.

SUMMARY

An embodiment that is described herein provides a network switch that includes circuitry, multiple ports and multiple hardware-implemented distinct-flow counters. The multiple ports are configured to receive packets from a communication network. Each of the multiple hardware-implemented distinct-flow counters is configured to receive (i) a respective count definition specifying one or more packet-header fields and (ii) a respective subset of the received packets, and to estimate a respective number of distinct flows that are present in the subset, by evaluating, over the packets in the subset, a number of distinct values in the packet-header fields belonging to the count definition. The circuitry is configured to provide each of the distinct-flow counters with the respective subset of the received packets, including providing a given packet to a plurality of the distinct-flow counters, and to identify an event-of-interest based on numbers of distinct flows estimated by the distinct-flow counters.

In some embodiments, the hardware-implemented distinct-flow counter has a storage space whose size is proportional to Log [Log(Nmax)] for counting up to Nmax distinct flows. In other embodiments, the circuitry is configured to define multiple rules over the packet-header fields, and to provide the subset of the received packets by identifying packets among the received packets that match one or more rules that are associated with respective distinct-flow counters, and forwarding the identified packets to the respective distinct-flow counters. In yet other embodiments, the circuitry is configured to define a single rule that is associated with each of the plurality of the distinct-flow counters, and to forward the given packet to each of the plurality of the distinct-flow counters in response to detecting that the given packet matches the single rule.

In an embodiment, the circuitry is configured to provide the given packet to the plurality of the distinct-flow counters by detecting that the given packet matches two or more different rules that each is associated with at least one of the plurality of the distinct-flow counters. In another embodiment, the circuitry is configured to detect that first and second packets among the received packets respectively match first and second different rules that are both associated with a single distinct-flow counter, and to forward the first and second packets to the single distinct-flow counter. In yet another embodiment, each distinct-flow counter includes a count state, and upon accepting a packet is configured to update the count state based on the accepted packet and the respective count definition.

In some embodiments, the circuitry is configured to update the count states in the plurality of the distinct-flow counters simultaneously, by forwarding the given packet to the plurality of the distinct-flow counters in parallel. In other embodiments, the count state includes multiple bins, and the distinct-flow counter is configured to update values of the bins on a packet-by-packet basis, and to estimate the number of distinct flows by averaging over the values of multiple bins.

There is additionally provided, in accordance with an embodiment that is described herein, a method, including, in a network switch that includes multiple hardware-implemented distinct-flow counters, receiving packets from a network to which the network switch connects. Each of the distinct-flow counters is provided with a respective subset of the received packets, including a given packet that is provided to a plurality of the distinct-flow counters. Each of the distinct-flow counters is preconfigured with a respective count definition specifying one or more packet-header fields, and estimates a respective number of distinct flows that are present in the subset, by evaluating, over the packets in the subset, a number of distinct values in the packet-header fields belonging to the count definition. An event-of-interest is identified based on numbers of distinct flows estimated by the distinct-flow counters.

These and other embodiments will be more fully understood from the following detailed description of the embodiments thereof, taken together with the drawings in which:

DETAILED DESCRIPTION OF EMBODIMENTS

Overview

Figure 1:
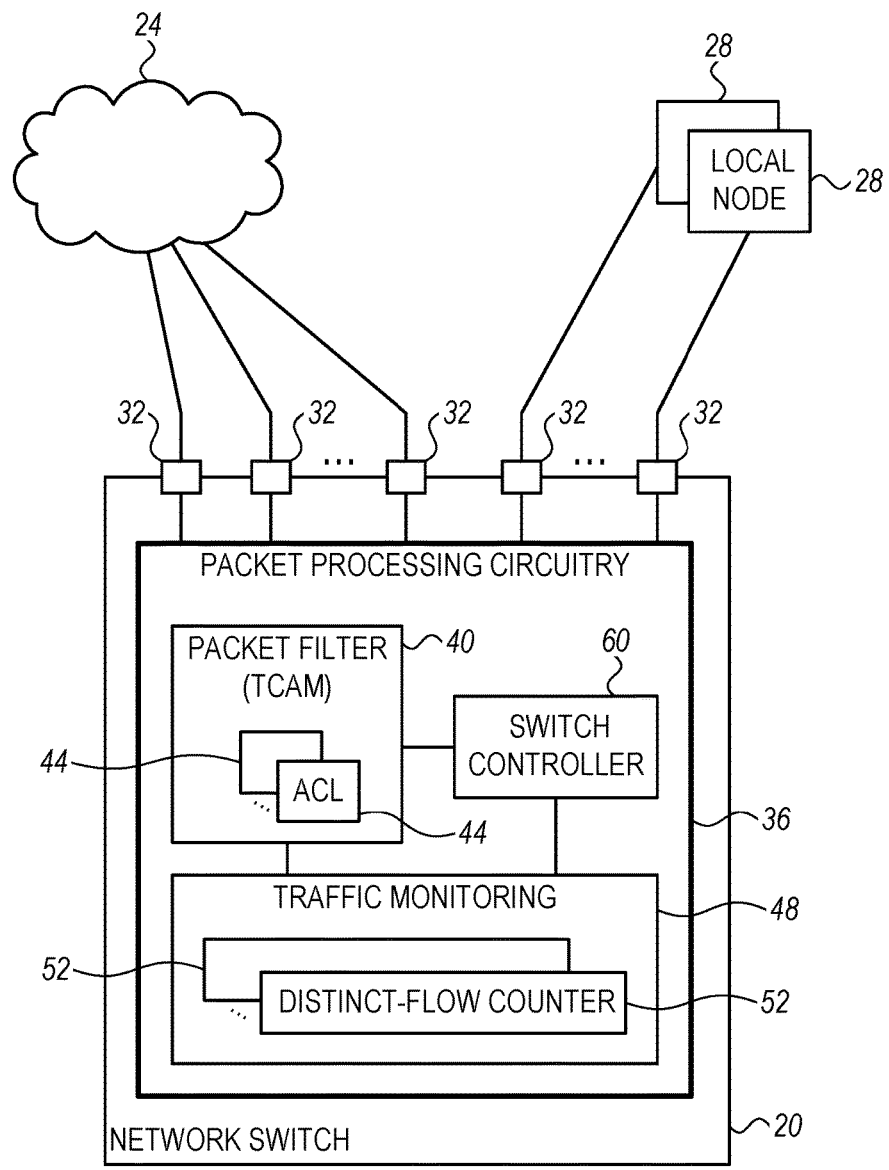
FIG. 1 is a block diagram that schematically illustrates a network switch that applies distinct-flow counting, in accordance with an embodiment that is described herein.

Identifying traffic patterns by network elements such as switches or routers is important for detecting various types of traffic anomalies. For example, a traffic anomaly may occur when a malicious attacker floods the network with traffic, in an attempt to cause a target network resource such as a network element or a server to become unavailable to legitimate users.

An attack of this sort, also referred to as a Denial Of Service (DOS) attack, may overwhelm the target with large amounts of traffic such as communication requests, thus significantly reducing its response time or even completely preventing the target from responding to legitimate requests. In a Distributed DOS (DDOS) attack, the attacker typically launches the attack from multiple sources, which makes the attack hard to detect and protect against.

Other traffic patterns of interest may result from faulty network elements or interconnections, misconfiguration of routes along the network, and the like.

Embodiments that are described herein provide improved systems and methods for identifying certain network traffic patterns by estimating the number of distinct flows traversing a network switch. A count definition for distinct-flow counting specifies one or more fields in the headers of the packets received in the switch. For example, a count definition that specifies the source address field can be used for evaluating the number of distinct source address values seen in a group of received packets. A large number of distinct source addresses among packets that are all destined to a single target may indicate that the target is being attacked.

Counting the exact number of distinct flows typically requires maintaining, in the switch, a state per distinct flow. This solution, however, may be expensive or otherwise infeasible in switches operating in a high-traffic network or when the expected number of distinct flows is very large (e.g., Millions or even beyond a Billion distinct flows). The number of distinct flows in a group of flows is also referred to herein as the "flow cardinality" of the group.

In the disclosed techniques, instead of exact counting, the switch efficiently estimates the number of distinct flows using small-footprint hardware. Moreover, the switch supports parallel distinct-flow counting according to multiple different count definitions. In some embodiments, a distinct-flow counter comprises a multi-bin array that updates on a packet-by-packet basis. The distinct-flow counter estimates the number of the distinct flows, e.g., cyclically or on demand, by averaging the bin values in the array.

In some embodiments, packets received in the switch are first queried against one or more Access Control Lists (ACLs) that each comprises one or more entries. An ACL entry typically comprises a rule and a respective action (e.g., forward or discard the packet) to be applied to a packet that matches the rule. In some embodiments, the action of a given rule can be configured to associate between the given rule and one or more distinct-flow counters. Such an association means that a packet that matches the given rule will be provided to the associated distinct-flow counters in parallel, causing the bin arrays in these distinct-flow counters to update simultaneously.

In some embodiments, a portion of the packets received is selected using the ACL rules, and forwarded to one or more distinct-flow counters. The flexibility in setting the ACL rules and count definitions in the respective associated distinct-flow counters enables the switch to identify complex traffic patterns with minimal latency. In some embodiments, the switch is configured to identify an event-of-interest based on numbers of distinct flows estimated by the distinct-flow counters. Moreover, in response to detecting a traffic anomaly, the switch can take corrective measures, such as configuring ACL rules for blocking traffic arriving from illegitimate sources. Since the distinct-flow counter requires only a small-sized memory, a switch may comprise a large number of such distinct-flow counters for monitoring a variety of traffic patterns, simultaneously.

The disclosed techniques can be used for low-latency detection of traffic anomalies in networks having multi-terabit capacity.

System Description

FIG. 1 is a block diagram that schematically illustrates a network switch 20 that applies distinct-flow counting, in accordance with an embodiment that is described herein. Network switch 20 (also referred to simply as "switch," for brevity) is connected to a communication network 24 and/or to one or more local nodes 28. Local nodes 28 may comprise, for example compute nodes that connect to the communication network using suitable interfaces.

Switch 20 may be comprised in communication network 24 in various applications such as, for example, data centers, High Performance Computing (HPC) systems, distributed computing systems, or any other application in which network nodes communicate with one another over a communication network.

Switch 20 comprises multiple ports 32 for connecting to communication network 24 and local nodes 28. In the present example, switch 20 comprises an Ethernet switch and communication network 24 comprises an Ethernet network. Alternatively, switch 20 is comprised in an IP network, or in any other suitable packet network operating in accordance with any suitable standards and protocols. In alternative embodiments, however, the disclosed techniques can be implemented in other kinds of network elements such as routers or bridges. The network element and network may operate in accordance with any other suitable communication standard or protocol, such as InfiniBand (IB).

Switch 20 accepts communication packets from communication network 24, local nodes 28 or both, via ports 32, and forwards each packet to a certain port 32 en-route to its destination. The port over which a given packet enters the switch is referred to as an ingress port, and the port over which a given packet leaves the switch is referred to as an egress port. In a typical switch implementation, however, a single port 32 may function both as an ingress port and as an egress port.

In the example of FIG. 1, switch 20 comprises packet processing circuitry 36, which performs forwarding of packets between ports 32. Packet processing circuitry 36 comprises a packet filter 40 that processes incoming packets by enforcing to an incoming packet a set of rules. The rules are typically defined over certain packet attributes and specify actions that are to be performed on the packet. The rules may relate, for example, to security privileges and/or to traffic monitoring. The applicable actions may be, for example, to discard the packet, to permit forwarding of the packet, or to apply a certain Quality of service (QoS) to the packet. Other applicable actions may comprise various routing actions, policing actions, metering actions, or any other suitable action type.

In some embodiments, a packet that matches a given rule belongs to a subset of the received packets for which distinct-flow counting is required. The action corresponding to such a rule specifies forwarding the packet for distinct-flow counting, as will be described below. The switch may forward the packet for distinct-flow counting in addition to applying to the packet one or more other actions that are specified for the rule.

In some embodiments, switch 20 stores the rules in one or more Access Control Lists (ACLs) 44 that are queried by packet processing circuitry 36. An ACL typically comprises multiple entries, wherein each entry comprises a set of packet attributes (e.g., defining a rule) and an applicable action. Packet processing circuitry 36 checks the attributes of each incoming packet against the applicable ACL or ACLs, and attempts to find a matching entry. If a match is found, the switch applies the action specified in the matching entry (e.g., discard or forward) to the packet. In some cases querying a single packet results in multiple matching ACL entries, in which case the switch applies the multiple respective actions to the packet.

In some embodiments, the set of rules in the ACL changes dynamically in accordance with dynamic changes in the traffic. For example, the ACL may be initially configured with a default set of rules. When the switch detects traffic anomaly, one or more of the rules in the default set changes accordingly. Alternatively or additionally, one or more rules are added to the ACL in response to detecting some event of interest. Managing the ACL rules dynamically enables the switch to support analyzing complex traffic anomalies, e.g., identifying the source of a malicious attack. In an embodiment, when the traffic anomaly is resolved, the switch returns to the default set of ACL rules.

In some embodiments, packet processing circuitry 36 quires packets that were received via a certain ingress port against a respective ACL that is assigned to this ingress port. Similarly, ACLs may be assigned to respective port-groups having multiple ingress ports per group, and used for querying packets received via any of the ingress ports of the respective groups. Additionally or alternatively, ACLs are defined per Virtual Local Area Network (VLAN) or group of VLANs, meaning that packet processing circuitry 36 processes the packets belonging to a certain VLAN according to the ACL associated with this VLAN.

In some embodiments, switch 20 stores ACLs 44 of packet filter 40 in a Content Addressable Memory (CAM), in the present example a Ternary CAM (TCAM). Packet processing circuitry 36 searches for a match in a given ACL by querying the ACL with a bit string corresponding to a set of packet attributes, referred to as a key. The TCAM identifies an ACL entry that matches the key and may return the index of that entry, the applicable action and/or a pointer to another table that holds the applicable action. The TCAM entries may also define one or more "don't care" bits that are to be ignored in the TCAM matching process. The query of a single packet may be cascaded over two or more ACL entries within the same or different ACLs 44, by specifying suitable cascading actions.

Packet processing circuitry 36 further comprises a traffic monitoring module 48 that comprises multiple distinct-flow counters 52. Each distinct-flow counter 52 is preconfigured with a respective count definition specifying one or more packet-header fields, e.g., a source address field, a destination address field or any other suitable field or a combination of multiple fields. In an embodiment, a given distinct-flow counter receives from packet filter 40 a subset of the packets received in the switch, and estimates a respective number of distinct flows that are present in the subset, by evaluating over the packets in the subset, a number of distinct values in the packet-header fields belonging to the count definition.

By first filtering the packets using rule matching techniques and then performing distinct-flow counting using the matching packets, the switch is able to identify complex traffic patterns and detect anomalies, e.g., as occurring in DDOS attacks. For example, a matching rule can specify the destination address of a target network node that is suspected to be attacked. In addition, the distinct-flow counter associated with this rule is configured to count the number of distinct source addresses from which packets are sent to this destination address. Detecting that the number of distinct source addresses exceeds a predefined threshold number may indicate that the target is being attacked.

Switch 20 comprises a switch controller 60 that carries out various management and other tasks of the switch. In some embodiments, switch controller 60 configures rules and respective actions in the entries of ACLs 44, including associations between rules and respective distinct-flow counters. In addition, switch controller 60 configures the distinct-flow counters with respective count definitions.

Flexible and Efficient Distinct-Flow Counting

Figure 2:
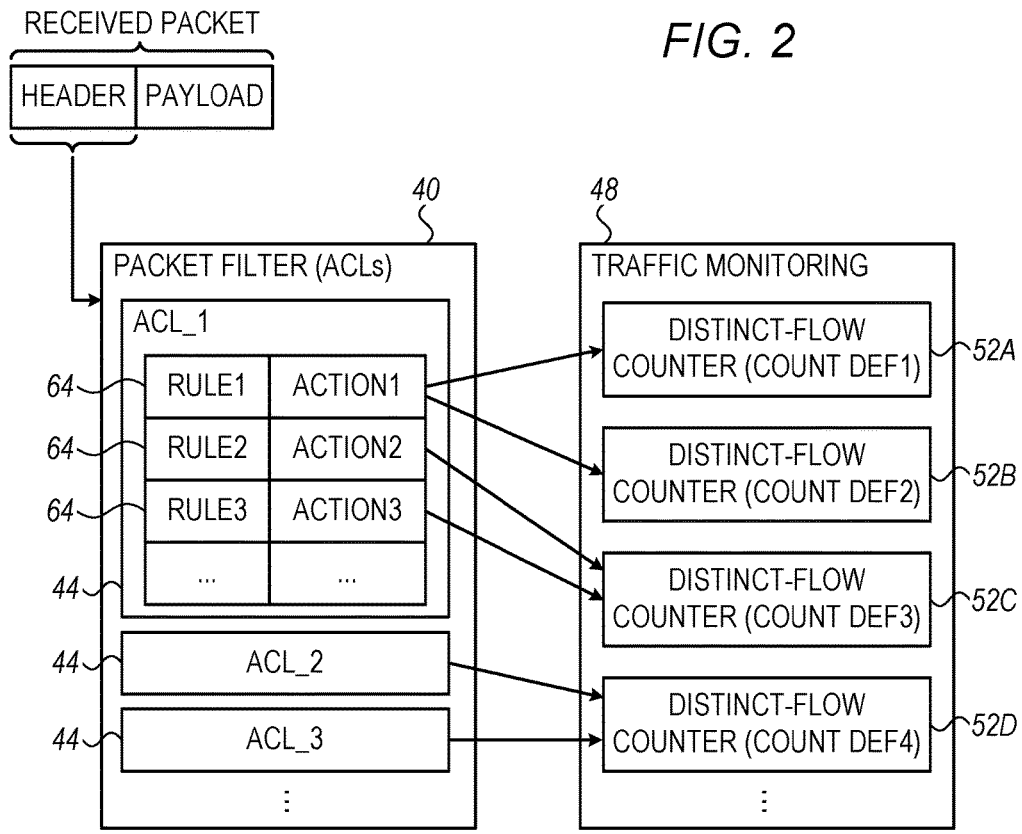
FIG. 2 is a diagram that schematically illustrates packet processing for estimating multiple distinct-flow counts in parallel, in accordance with an embodiment that is described herein.

FIG. 2 is a diagram that schematically illustrates packet processing for estimating multiple distinct-flow counts in parallel, in accordance with an embodiment that is described herein. The packets received in the switch are first processed by packet filter 40 to find matching rules. The packet filter identifies, among the received packets, packets that match one or more rules having associated distinct-flow counters, and forwards the identified packets to the relevant distinct-flow counters.

In the example of FIG. 2, three ACLs 44, denoted ACL_1, ACL_2, and ACL_3 are comprised in packet filter 40. Each of these ACLs typically comprises multiple entries 64. In the present example, three entries of ACL_1 are depicted, in which the rules and respective actions are denoted RULE1 . . . RULE3 and ACTION1 . . . ACTION3.

In the present example, traffic monitoring module 48 comprises distinct-flow counters 52A . . . 52D that are preconfigured with respective count definitions. A count definition specifies one or more fields in the packets over which to count the distinct values. Packet-header fields that can be used for count definition comprise, for example, source and destination addresses, source and destination port numbers, the undelaying protocol, a VLAN number, and/or any other suitable field. The count definition may include a single filed or a combination of multiple fields.

A rule in an ACL of the packet filter can be associated with a given distinct-flow counter 52, e.g., by configuring the action of the rule to forward packets that match the rule to the given distinct-flow counter.

In the example of FIG. 2, RULE1 is associated with distinct-flow counters 52A and 52B. As a result, a packet that matches RULE1 will be forwarded to both distinct-flow counters, in parallel. Such a configuration can be used for estimating separate distinct-flow counts based on two different count definitions, over the same subset of the received packets. For example, the switch may monitor flow cardinality per ingress port and also per egress port. A packet received via a given ingress port and destined to a given egress port will be forwarded for updating the two respective distinct-flow counts.

Further in FIG. 2, each of RULE2 and RULE3 is associated with the same distinct-flow counter 52C. In this example, two different packets that are received in the switch, and match RULE2 and RULE3, respectively, will both be forwarded by the packet filter to the same distinct-flow counter 52C.

In the contest of the present patent application and in the claims, the term "in parallel" means that a packet is forwarded to multiple distinct-flow counters as a result of finding for the packet one or more matching rules that are associated with these distinct-flow counters. Forwarding the packet to multiple distinct-flows in parallel may occur simultaneously or with minimal time difference.

Consider an example setup in which RULE2 and RULE3 are configured to match respective different destination addresses, and distinct-flow counter 52C is configured to estimate the number of distinct source addresses. Such a configuration can be used to detect a DDOS attack targeted simultaneously toward both the destination addresses.

Distinct-flow counting can be used in various applications. For example, in a data center that runs a large number of distributed services, the disclosed techniques may be applied to evaluate load balancing among server-groups that run different respective services. As another example, a data center may run a large number of third-party applications that are invisible to the data center operator. The disclosed techniques can be used for evaluating the number of users that use each of these applications.

Note that rules that are associated with a common distinct-flow counter may belong to different ACLs. For example, in FIG. 2 different rules in ACL_2 and ACL_3 respectively, are associated with a common distinct-flow counter 52D. Note that a given packet may match multiple rules in multiple respective ACLs, and forwarded for counting by one or more distinct-flow counters.

The switch controller may configure different distinct-flow counters with different respective count definitions. Alternatively, two or more of the distinct-flow counters may be configured with the same count definition. In some embodiments, the switch controller identifies an event-of-interest, such as traffic anomaly or other traffic pattern of interest, based on numbers of distinct flows estimated by the distinct-flow counters.

Distinct-Flow Counter Implementation

Figure 3:
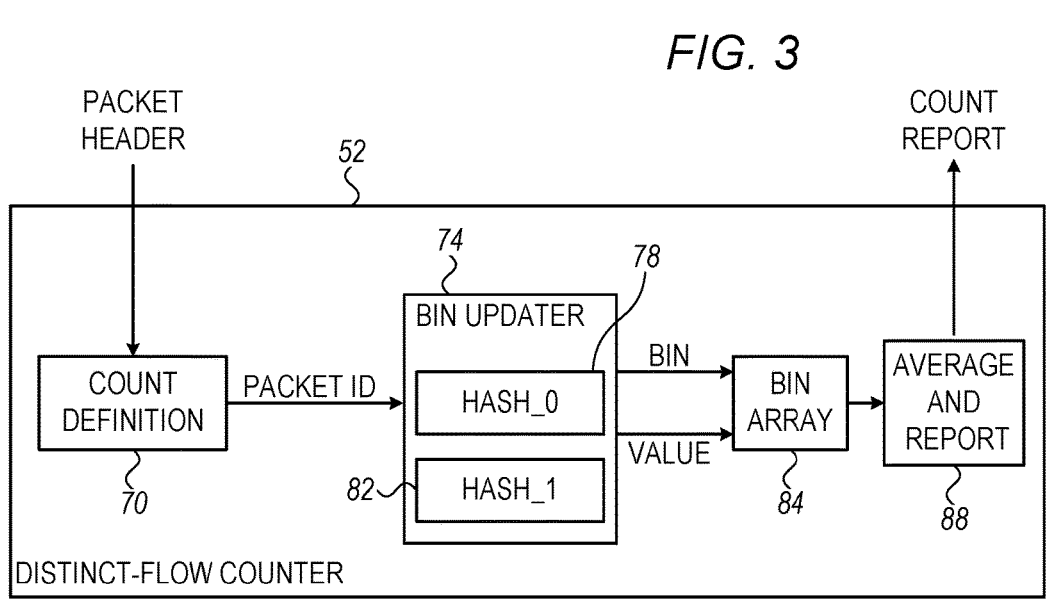
FIG. 3 is a block diagram that schematically illustrates a distinct-flow counter, in accordance with an embodiment that is described herein.

FIG. 3 is a block diagram that schematically illustrates distinct-flow counter 52, in accordance with an embodiment that is described herein. In some embodiments, the distinct-flow counter is implemented in hardware for handling large amounts of traffic. In an example embodiment, distinct-flow counters 52 can be implemented as described in the paper "HyperLog Log: the analysis of a near-optimal cardinality estimation algorithm," cited above. Alternatively, other suitable variants of the Log Log approach can also be used. Further alternatively, any other suitable type of distinct-value estimation scheme can be used for implementing the distinct-flow counters, including, for example, the Hashset and Linear probabilistic methods.

In some embodiments, to support estimating up to a number Nmax of distinct flows, the distinct-flow counter is required to have a local memory whose size is proportional to Log [Log(Nmax)].

In some embodiments, distinct-flow counter 52 receives a stream of packets from packet filter 40 and a count definition 70 from the switch controller. The count definition specifies one or more fields in the packets over which to count distinct values. For each packet accepted, the distinct-flow counter calculates a packet identification value (packet ID) based on the count definition. For example, the packet ID may comprise the values in the packet header fields specified by the count definition, or a result of some function applied to these values.

Distinct-flow counter 52 further comprises a bin updater 74, which is configured to update a count state of the distinct flow counter, implemented as a bin array 84, on a packet-by-packet basis. Bin array 84 comprises a configurable number M of bins, wherein each bin comprises B bits. Depending on the application, the number of bins M may be in the range 2 . . . 1024, and the number of bits per bin B in the range 4 . . . 8, although other suitable values are also possible. The number of bins M can be re-configured to adapt to changing traffic conditions. Alternatively or additionally, selecting the value of M enables a tradeoff between storage requirements and count accuracy.

Bin updater 74 comprises a hash function 78 denoted HASH_0, and a hash function 82 denoted HASH_1. The bin updater applies HASH_0 and HASH_1 to the packet ID to produce a bin index (denoted BIN in the figure) in the range 0 . . . M−1, and a bin value (denoted VALUE in the figure) in the range 0 . . . $2^B-1$, respectively. Distinct-flow counter 52 updates bin array 84 by storing the B-bit value calculated by HASH_1 in the bin indexed by the index outcome of HASH_0. Example hash functions that can be used for implementing HASH_0 and HASH_1 include the Fowler-Noll-Vo (FNV) hash function, the Toeplitz hash function, and a Cyclic Redundancy Check (CRC) hash function.

The hash function HASH_0 is typically designed to distribute its input uniformly over the M bins.

The bin updater may calculate the bin index (BIN) using the following expression:

BIN=HASH_0(Packet ID)     Equation 1

The bin updater may further calculate the bin value (VALUE) using any suitable method, such as, for example, by calculating the expression:

VALUE=(VALUE) OR [HASH_1(Packet ID)]     Equation 2 wherein in Equation 2, the operator OR denotes a logical bitwise OR operation. In this case HASH_1 outputs random (or pseudo-random) B-bit values in the range 0 . . . $2^B-1$. Alternatively, the bin updater may calculate the bin value using the expression:

VALUE=max{VALUE,FirstSetID[HASH_1(Packet ID)]}     Equation 3 wherein the operator max{x,y} selects x if x>y, and y otherwise. The operator FirstSetID[w] outputs the position of the first nonzero bit in w starting the count from the Least Significant Bit (LSB), which is the leftmost bit in this example. For example, for w=0001 ..., FirstSetID[w]=4. In Equation 3, HASH_1 outputs random numbers of B bits. The FirstSetID operator outputs numbers having $Log_2(B)$ bits.

Note that the distinct-flow counter updates bin array 84 per each packet accepted and does not need to store a dedicated state per each distinct flow. Therefore, the distinct-flow counter requires only a small storage space for the count state, e.g., on the order of a few Kbytes to support estimating up to a number of $10^9$ or more distinct flows with high precision.

Distinct-flow counter 52 comprises an average and report module 88 that estimates the number of distinct flows based on the values accumulated in the bin array. In an embodiment, the distinct-flow counter estimates the number of distinct flows by averaging the values VALUE(m) m=0 ... M−1 in bin array 84, as given by:

$$Z = Const(M) \cdot Average_m[VALUE(m)] \qquad \text{Equation 4}$$

Average and report module 88 may apply any suitable type of averaging operation, such as, for example, a harmonic average operation denoted H(•) and given by:

$$Average_m[VALUE(m)] = \frac{1}{\sum_{m=0}^{M-1} [2^{-VALUE(m)}]} \qquad \text{Equation 5}$$

In Equation 4, Const(M) is a constant value that depends on the number of bins M, and compensates for estimation bias. The value of Const(M) additionally depends on the expression used for calculating VALUE as given in Equations 2 and 3 above.

In some embodiments, bin updater 74 comprises a single hash function (denoted HASH). In such embodiments, and assuming $M=2^k$ for some integer k, bin updater 74 calculates a binary variable X=HASH(PacketID), and splits the bits of X between the bin-index BIN and the bin-value VALUE. For example, the part of X represented by the first k bits serves as BIN, and the part of X that remains after discarding the first k bits serves as VALUE.

In some embodiments, calculating Z in Equation 4 is based on calculating an arithmetic average of VALUE(m). In this case the average calculation is given by:

$$Average_m[VALUE(m)] = 2^{\frac{1}{M}\sum_{m=0}^{M-1} VALUE(m)} \qquad \text{Equation 6}$$

Scheduling the calculation of the number of distinct flows, e.g., as given in Equation 4 (or Equation 6), can be carried out in various ways. In an example embodiment, average and report module 88 calculates Equation 4 cyclically, e.g., periodically at predefined intervals. Alternatively or additionally, average and report module 88 calculates Equation 4 upon receiving an explicit request, e.g., from the switch controller. Average and report module 88 may report the evaluated number of distinct flows per each calculation of the average as in Equation 4.

Reporting the number of distinct flows may be synchronized or unsynchronized to the time of calculating this number, e.g., using Equation 4. For example, reporting the number of distinct flows can be carried out once per several evaluations of Equation 4, or upon an explicit request. In some embodiments, average and report module 88 reports only the estimated number of distinct flows. Alternatively or additionally, average and report module 88 reports the estimated number of distinct flows when this number exceeds a predefined threshold number.

The estimation accuracy in various variants of the Log Log count approach is proportional to 1/√M, e.g., for M=32 the estimation accuracy would be about 18%. In some embodiments, such accuracy is insufficient for stable counting, and the processing applies a smoothing function (e.g., a low pass filter) to multiple count estimates provided by the distinct-flow counter. In an example embodiment, the processing circuitry calculates a smoothed count by averaging the smoothed count value with an updated count estimate using the expression:

$$SmoothedCount = (SmoothedCount + EstimatedCount)/2 \qquad \text{Equation 7}$$

In some embodiments, bin updater 74 applies the hash function (HASH_0, HASH_1 or both) to a variable that combines PacketID of count definition 70 with a salt value (not shown). For example, the input to the hash function may comprise a variable that concatenates PacketID and the salt value. In some embodiments, the salt value updates cyclically, e.g., incremented by 1 or by any other suitable value, or determined randomly. Alternatively, other suitable salting techniques can also be used. In general, the purpose of combining a salt value within the input provided to the hash function is to improve the randomness among the outcome values of the hash function.

To accommodate time-varying traffic, the packet processing circuitry restarts the distinct-flow counters cyclically, thus allowing the counter's states to update by incoming packets and re-reading updated count estimates. The period between consecutive restarting events is implementation-dependent and may vary, for example, between 10 microseconds and 0.5 second. In an embodiment, restarting a distinct-flow counter is carried out by zeroing the bin values in the counter bin-array.

The configuration of switch 20 shown in FIGS. 1-3, including packet filter 40 and distinct-flow counters 52, is an example configuration, which is chosen purely for the sake of conceptual clarity. In alternative embodiments, any other suitable switch configuration can be used. Some elements of switch 20, such as packet filter 40 and distinct-flow counters 52, may be implemented in hardware, e.g., in one or more Application-Specific Integrated Circuits (ASICs) or Field-Programmable Gate Arrays (FPGAs). Additionally or alternatively, some switch elements can be implemented using software, or using a combination of hardware and software elements.

In some embodiments, some of the functions of packet processing circuitry 36 may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In the context of the present patent application, packet processing circuitry 36 refers to all the elements of switch 20 excluding ports 32. In FIG. 1, the packet processing circuitry comprises packet filter 40, traffic monitoring module 48 and switch controller 60. The packet processing circuitry is also referred to simply as "circuitry," for brevity.

Figure 4:
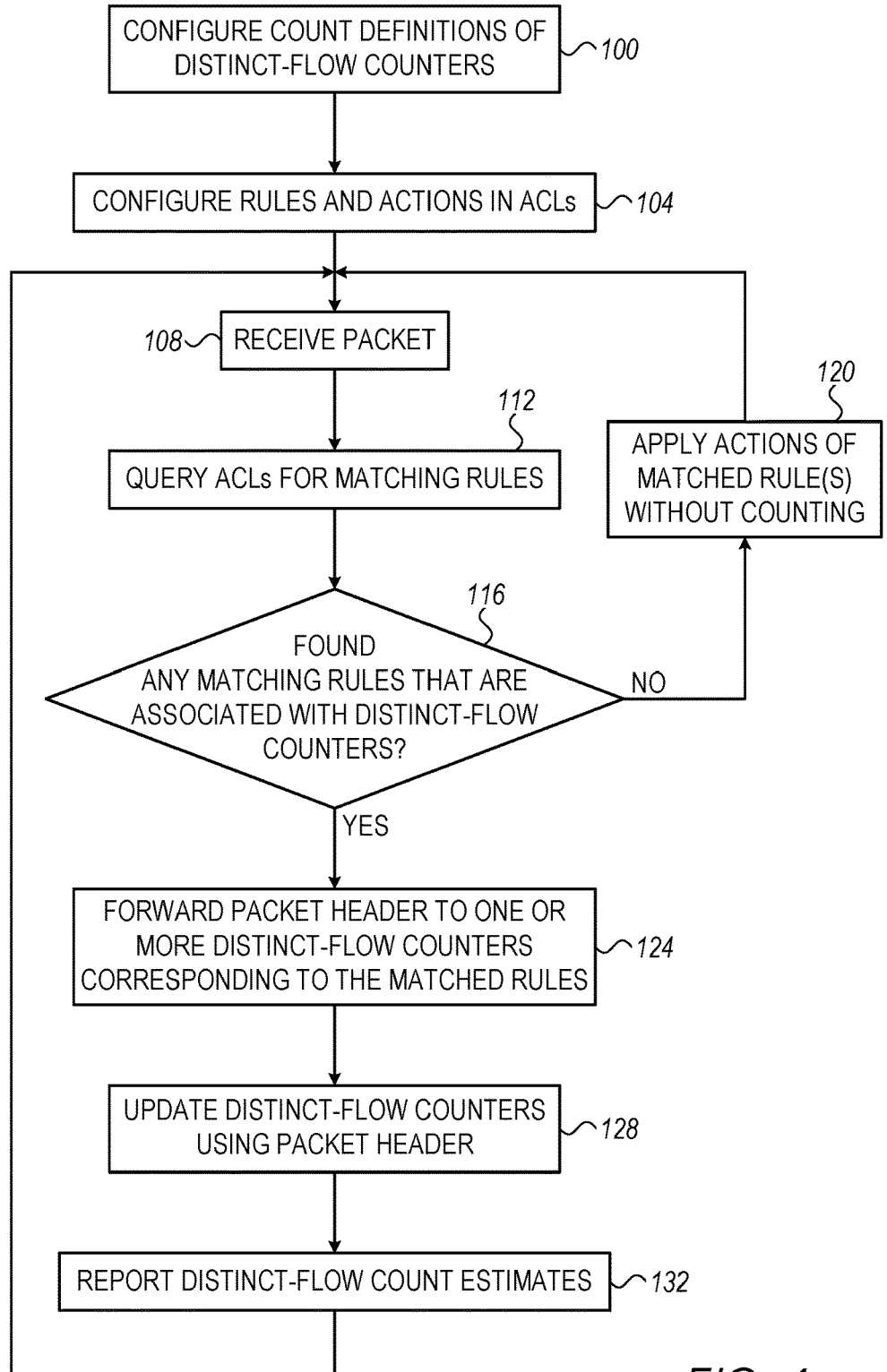
FIG. 4 is a flow chart that schematically illustrates a method for traffic monitoring that supports estimating multiple distinct-flow counts in parallel, in accordance with an embodiment that is described herein.

A Method for Traffic Monitoring with Multiple Distinct-Flow Counts in Parallel FIG. 4 is a flow chart that schematically illustrates a method for traffic monitoring that supports estimating multiple distinct-flow counts in parallel, in accordance with an embodiment that is described herein. The method can be executed, for example, by switch 20 comprising distinct-flow counters 52 of FIG. 3.

The method begins with packet processing circuitry 36 configuring count definitions 70 in respective distinct-flow counters 52, at a counter-definition setting step 100. At an ACL configuration step 104, the switch controller configures one or more rules in each of ACLs 44. In some embodiments, the switch controller configures at least one rule to be associated with one or more respective distinct-flow counters 52.

At a reception step 108, the packet processing circuitry receives a packet from the network via an ingress port 32, and at a query step 112, attempts matching the packet to one or more rules in the ACLs in packet filter 40 using the header parts of the packet, as described above. At an action checking step 116, the packet processing circuitry checks whether any matching rules that are associated with one or more distinct-flow counters have been found, and if none were found proceeds to an action application step 120 to apply the relevant actions without forwarding the packet to the traffic monitoring module, and then loops back to step 108 to receive a subsequent packet.

Otherwise, at a forwarding step 124, the packet processing circuitry forwards the packet (or only the packet headers), to one or more distinct-flow counters 52 that are associated with the matching rules, in parallel.

At an updating step 128, each of the distinct-flow counters to which the packet was forwarded at step 124 updates its internal bin array 84 as described, for example, with reference to FIG. 3 above.

At a reporting step 132, the distinct-flow counters (or a partial subgroup thereof) report their respective count estimates, e.g., to switch controller 60. The switch controller may, for example, poll the distinct-flow counters cyclically at a predefined order, in an embodiment. Alternatively, one or more of the distinct-flow counters schedules the reporting internally. In this case, the switch controller gets reports from these distinct-flow counters using interrupt signals generated by the distinct-flow counters. A report from a distinct-flow counter may include an updated count estimate, indication whether the count estimates exceeds a predefined threshold number, or both.

The embodiments described above are given by way of example, and other suitable embodiments can also be used. For example, although the embodiments described typically employ a Hyper log log method for estimating the number of distinct flows, any other suitable counting method can also be used.

Although in the embodiments described above, the traffic anomalies are detected and reported within the switch, in alternative embodiments, the switch may report traffic patterns and/or anomalies to a central entity in the network that analyzes the network performance based on reports received from multiple switches.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network switch, comprising:
   multiple ports, configured to receive packets from a communication network;
   multiple hardware-implemented distinct-flow counters, wherein each distinct-flow counter is configured to receive (i) a respective distinct-count definition and (ii) a respective subset of the received packets, and wherein each distinct-flow counter is further configured to estimate a respective number of different flows to which the packets in the subset belong, in accordance with the distinct-count definition; and
   circuitry, configured to:
   provide each of the distinct-flow counters with the respective subset of the received packets, including providing a given packet to a plurality of the distinct-flow counters;
   identify a predefined traffic pattern based on respective numbers of different flows estimated by the distinct-flow counters; and
   take at least one corrective measure responsively to the identified traffic pattern.

2. The network switch according to claim 1, wherein the hardware-implemented distinct-flow counter has a storage space whose size is proportional to Log [Log(Nmax)] for counting up to Nmax distinct flows.

3. The network switch according to claim 1, wherein the circuitry is configured to define multiple rules over the packet-header fields, and to provide the subset of the received packets by identifying packets among the received packets that match one or more rules that are associated with respective distinct-flow counters, and forwarding the identified packets to the respective distinct-flow counters.

4. The network switch according to claim 3, wherein the circuitry is configured to define a single rule that is associated with each of the plurality of the distinct-flow counters, and to forward the given packet to each of the plurality of the distinct-flow counters in response to detecting that the given packet matches the single rule.

5. The network switch according to claim 3, wherein the circuitry is configured to provide the given packet to the plurality of the distinct-flow counters by detecting that the given packet matches two or more different rules that each is associated with at least one of the plurality of the distinct-flow counters.

6. The network switch according to claim 1, wherein the circuitry is configured to detect that first and second packets among the received packets respectively match first and second different rules that are both associated with a single distinct-flow counter, and to forward the first and second packets to the single distinct-flow counter.

7. The network switch according to claim 1, wherein each distinct-flow counter comprises a count state, and upon accepting a packet is configured to update the count state based on the accepted packet and the respective count definition.

8. The network switch according to claim 7, wherein the circuitry is configured to update the count states in the plurality of the distinct-flow counters simultaneously, by forwarding the given packet to the plurality of the distinct-flow counters in parallel.

9. The network switch according to claim 7, wherein the count state comprises multiple bins, wherein the distinct-flow counter is configured to update values of the bins on a packet-by-packet basis, and to estimate the number of distinct flows by averaging over the values of multiple bins.

10. A method, comprising:
in a network switch that comprises multiple hardware-implemented distinct-flow counters, receiving packets from a network to which the network switch connects;
providing each of the distinct-flow counters with (i) a respective distinct-count definition and (ii) a respective subset of the received packets, including providing a given packet to a plurality of the distinct-flow counters, wherein each of the distinct-flow counters estimates a respective number of different flows to which the packets in the subset belong, in accordance with the distinct-count definition;
identifying a predefined traffic pattern, based on respective numbers of different flows estimated by the distinct-flow counters; and
taking at least one corrective measure responsively to the identified traffic pattern.

11. The method according to claim 10, wherein each of the hardware-implemented distinct-flow counters has a respective storage space whose size is proportional to Log[Log(Nmax)] for counting up to Nmax distinct flows.

12. The method according to claim 10, and comprising defining multiple rules over the packet-header fields, wherein providing the subset of the received packets comprises identifying packets among the received packets that match one or more rules that are associated with respective distinct-flow counters, and forwarding the identified packets to the respective distinct-flow counters.

13. The method according to claim 12, wherein defining the rules comprises defining a single rule that is associated with each of the plurality of the distinct-flow counters, and wherein providing the given packet comprises forwarding the given packet to each of the plurality of the distinct-flow counters in response to detecting that the given packet matches the single rule.

14. The method according to claim 12, wherein providing the given packet to the plurality of the distinct-flow counters comprises detecting that the given packet matches two or more different rules that each is associated with at least one of the plurality of the distinct-flow counters.

15. The method according to claim 10, wherein providing the subset of the received packets comprises detecting that first and second packets among the received packets respectively match first and second different rules that are both associated with a single distinct-flow counter, and forwarding the first and second packets to the single distinct-flow counter.

16. The method according to claim 10, wherein each distinct-flow counter comprises a count state, and comprising, upon accepting a packet in a distinct-flow counter, updating the respective count state based on the accepted packet and the respective count definition.

17. The method according to claim 16, and comprising updating the count states in the plurality of the distinct-flow counters simultaneously, by forwarding the given packet to the plurality of the distinct-flow counters in parallel.

18. The method according to claim 16, wherein the count state comprises multiple bins, wherein updating the count state comprises updating values of the bins on a packet-by-packet basis, and wherein estimating the number of distinct flows comprises averaging over the values of multiple bins.

19. The network switch according to claim 1, wherein the distinct-count definition, for a given distinct-flow counter, specifies at least one packet header field over which the given distinct-flow counter estimates the number of different flows.

20. The network switch according to claim 1, wherein the circuitry is configured to take the at least one corrective measure by blocking traffic arriving from illegitimate sources.

21. The network switch according to claim 1, wherein the circuitry is configured to take the at least one corrective measure by reporting the identified traffic pattern to a central entity that analyzes performance of the communication network.

22. The method according to claim 10, wherein receiving the distinct-flow definition for a given distinct-flow counter, comprises receiving a distinct-flow definition that specifies at least one packet header field over which the given distinct-flow counter estimates the number of different flows.

23. The method according to claim 10, wherein taking the at least one corrective measure comprises blocking traffic arriving from illegitimate sources.

24. The method according to claim 10, wherein taking the at least one corrective measure comprises reporting the identified traffic pattern to a central entity that analyzes performance of the communication network.

* * * * *